(12) United States Patent
d'Entremont et al.

(10) Patent No.: US 8,423,901 B2
(45) Date of Patent: Apr. 16, 2013

(54) DISPLAYING CONTENT OUTSIDE IFRAME CONTAINER

(75) Inventors: Curtis Phillip d'Entremont, Markham (CA); Adam Glen Archer, North York (CA); Dejan Glozic, Toronto (CA); Michael Alexander Pawlowski, Markham (CA); Robert Retchless, North York (CA)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/723,847

(22) Filed: Mar. 15, 2010

(65) Prior Publication Data

US 2011/0225540 A1    Sep. 15, 2011

(51) Int. Cl.
G06F 3/048    (2006.01)
G06F 17/00    (2006.01)

(52) U.S. Cl.
USPC ............ 715/788; 715/240; 715/786; 715/790

(58) Field of Classification Search .................. 715/786, 715/788, 790, 240
See application file for complete search history.

(56) References Cited

U.S. PATENT DOCUMENTS

| | | | | |
|---|---|---|---|---|
| 7,051,084 | B1 * | 5/2006 | Hayton et al. | 715/234 |
| 7,430,712 | B2 * | 9/2008 | Arokiaswamy | 715/234 |
| 2006/0053048 | A1 * | 3/2006 | Tandetnik | 705/14 |
| 2009/0099901 | A1 * | 4/2009 | Sah et al. | 715/209 |
| 2009/0299862 | A1 * | 12/2009 | Fan et al. | 705/14.73 |
| 2009/0327869 | A1 * | 12/2009 | Fan et al. | 715/240 |
| 2011/0161990 | A1 * | 6/2011 | Smith et al. | 719/328 |

OTHER PUBLICATIONS

Danny Goodman et al., "JavaScript(R) Bible," Oct. 5, 2010, Seventh Edition, pp. 868-874.*

* cited by examiner

*Primary Examiner* — Steven B Theriault
*Assistant Examiner* — Dino Kujundzic
(74) *Attorney, Agent, or Firm* — Holland & Knight LLP; Brian J. Colandreo, Esq.; Rory E. Foster, Esq.

(57) ABSTRACT

A computer-implemented method, system, and computer program product for displaying content outside the initial boundary of an IFRAME container. The method includes: detecting a first action; and expanding the size of the IFRAME to a size that is sufficient to substantially display the content with a floating effect. The method may further include: detecting a second action; and restoring said size of said IFRAME to said initial size of said IFRAME.

14 Claims, 8 Drawing Sheets

DISPLAYING CONTENT OUTSIDE IFRAME CONTAINER

BACKGROUND OF THE INVENTION

The present disclosure relates generally to graphical user environments. More particularly, the present disclosure relates to displaying content outside the original boundary of an IFRAME container.

DESCRIPTION OF THE RELATED ART

In graphical user environments, web mashup applications, for example, may employ Inline Frame (IFRAME) elements to display sections of external content. The content may consist of Document Object Model (DOM) elements that are confined within the boundary of the IFRAME (that is, the IFRAME container). Using Javascript as an example, if the Javascript within the IFRAME invokes a transient element that floats on top of standard content and extends beyond the IFRAME container, that element will be clipped and scrollbars would appear. This is problematic and visually jarring for elements that rely on a "floating" effect such as dialogs, tool tips and menus. Existing solutions produce an on-screen display of an element that appears compressed or constrained, if the element requires more on-screen real-estate than the IFRAME boundary allows or if there are multiple elements to be displayed within the IFRAME causing the display of one element to obscure the display of another.

BRIEF SUMMARY OF THE INVENTION

In one aspect of the present disclosure, a computer-implemented method is provided for displaying content outside the original boundary of an IFRAME container. The method includes: (a) detecting a first action; and (b) expanding the size of the IFRAME to a size that is sufficient to substantially display the content with a floating effect.

In another aspect of the present disclosure, a computer program product is provided for displaying content outside the initial boundary of an IFRAME container. The computer program product includes computer program instructions stored on a computer readable storage medium, where the instructions, when executed, will cause a computer to perform the steps of the method.

In still another aspect of the present disclosure, a computer-implemented system is provided for displaying content outside the initial boundary of an IFRAME container. The system includes one or more devices that execute the steps of the method.

BRIEF DESCRIPTION OF THE SEVERAL VIEWS OF THE DRAWINGS

The block diagrams and flowcharts in the Figures illustrate the architecture, functionality, and operation of possible embodiments of methods, systems, and computer program products. In this regard, each block in the block diagrams or flowcharts may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

DETAILED DESCRIPTION OF THE INVENTION

It will be readily understood that embodiments of the present disclosure, as generally described and illustrated in the figures herein, may be arranged and designed in a wide variety of different configurations in addition to the described preferred embodiments. Thus, the following detailed description of the embodiments of the present disclosure, as represented in the figures, is not intended to limit the scope of the disclosure, as claimed, but is merely representative of selected preferred embodiments of the disclosure. The following description is intended only by way of example, and illustrates certain selected preferred embodiments of the disclosure as claimed herein.

When an action, such as a mouse-over event, triggers a need for content to achieve a floating effect, the embodiments of the present disclosure allow the floating content within an IFRAME to be displayed entirely or partially outside the IFRAME's container. The floating content displays, on the screen, as breaking out of the IFRAME, when in fact it does not. Instead, the IFRAME has grown to accommodate the content. When the floating content is closed or a mouse-out action occurs, the IFRAME is restored to its original size.

The IFRAME container is not the same as the IFRAME element. Rather, the container is a parent or ancestor element of the IFRAME. Typically, the container shows a border and a trim around the IFRAME that neatly encapsulates the IFRAME and shows the user where the IFRAME starts and ends.

Figure 1:
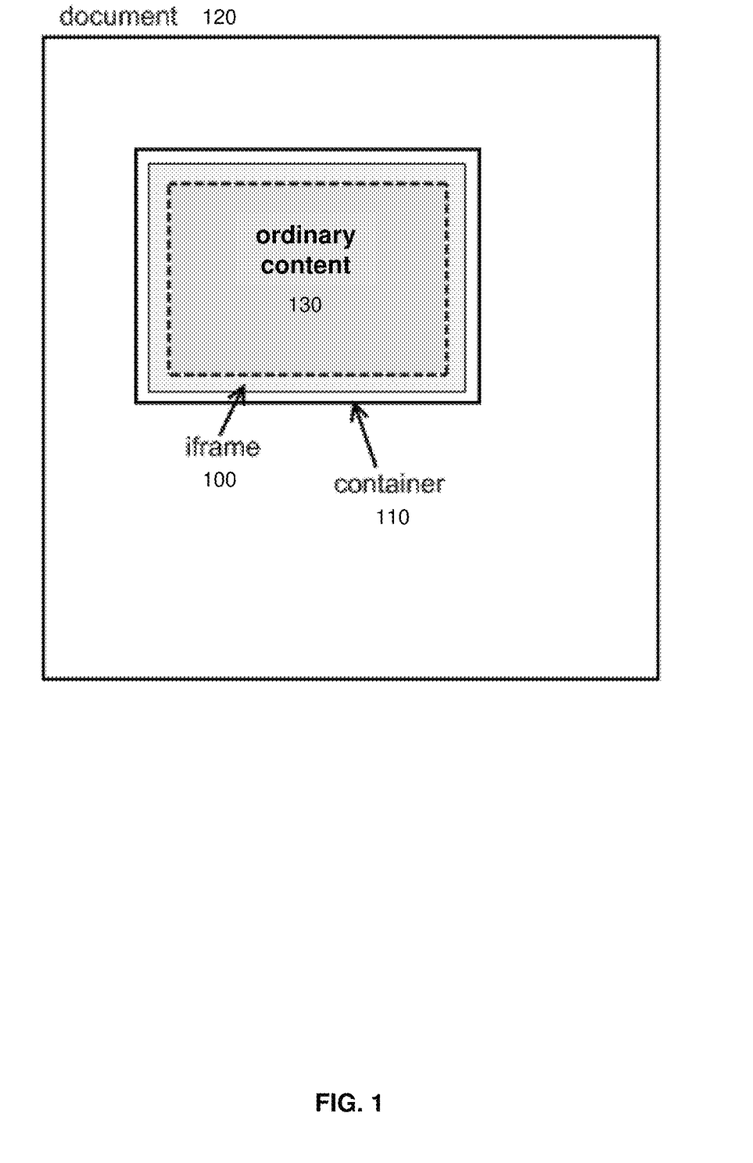
FIG. 1 is a block diagram that illustrates an IFRAME that is initially contained in the IFRAME container according to an embodiment of the present disclosure.

Referring to FIG. 1, a block diagram illustrates an IFRAME 100 that is initially contained in the IFRAME container 110. The IFRAME 100 is an element of the document 120.

The IFRAME 100 has an initial size, an initial position, and an initial visibility. Content can be considered as floating content and/or ordinary content (i.e., content that does not display with a floating effect.) As shown in FIG. 1, the ordinary content 130 is displayed within the IFRAME 100. The ordinary content 130 has an initial size and an initial position.

Figure 6:
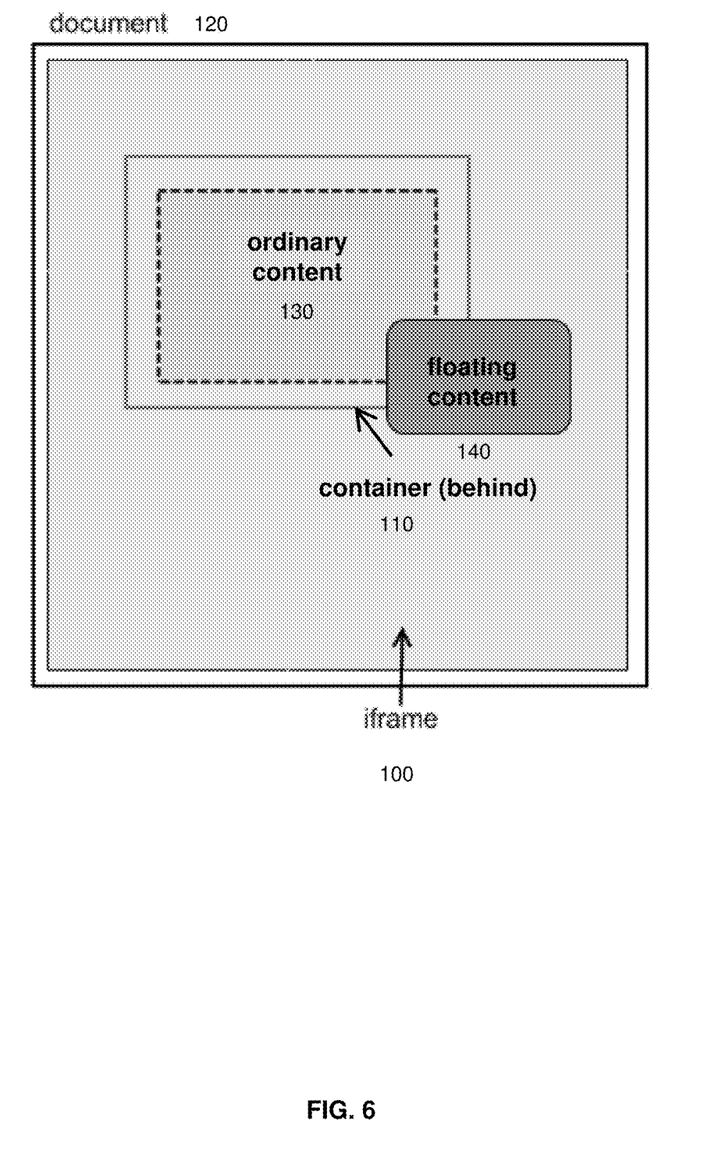
FIG. 6 is a block diagram that illustrates an expanded IFRAME displaying floating content according to an embodiment of the present disclosure.

There are many techniques for accessing the properties of the document 120. For example, in JavaScript, the properties of a JavaScript enabled HTML document 120 may be accessed through a JavaScript object 'window.document'. As a result of the first action, such as a mouse-over for example, the JavaScript code in the ordinary content 130 within the IFRAME 100 will display the floating content 140 (FIG. 6). To show a section of the ordinary content 130 coming from another server using an IFRAME 100, the IFRAME's source or 'src' property (i.e., the document 120 to be loaded) is set to a path on the local server that is configured to proxy ordinary content 130 to the remote server. As another example, a proxy may be used instead of a remote URL in order to satisfy the browser's same-origin policy.

Figure 2:
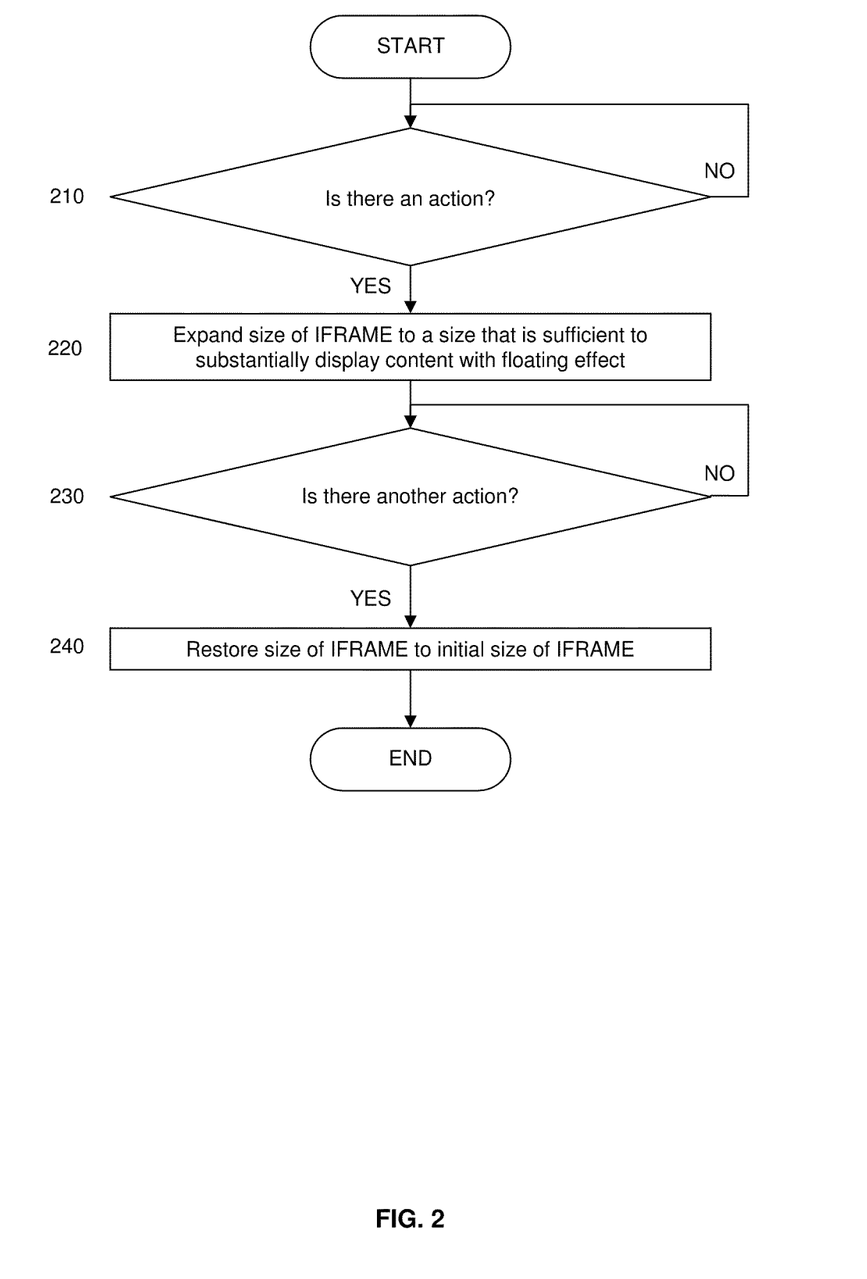
FIG. 2 is a flow chart illustrating the computer-implemented method for displaying content outside the initial boundary of an IFRAME container according to an embodiment of the present disclosure.

Referring to FIG. 2, a flow chart illustrates the computer-implemented method for displaying content outside the initial boundary of an IFRAME container. In FIG. 2, the method includes the steps of: detecting a first action 210; and expanding the size of the IFRAME to a size that is sufficient to substantially display the content with a floating effect 220. The first action may be one that would cause the content to be displayed at least partially outside the IFRAME container. A size that is sufficient to substantially display the content with a floating effect may be a size that is large enough such that a scrollbar is not required to view said floating portion.

The method may further include the steps of: detecting a second action 230; and restoring the size of the IFRAME to the initial size of the IFRAME 240. The second action may be one that would cause the content to be displayed within an IFRAME container—for example, an action that would cause the floating content to be hidden.

Figure 3:
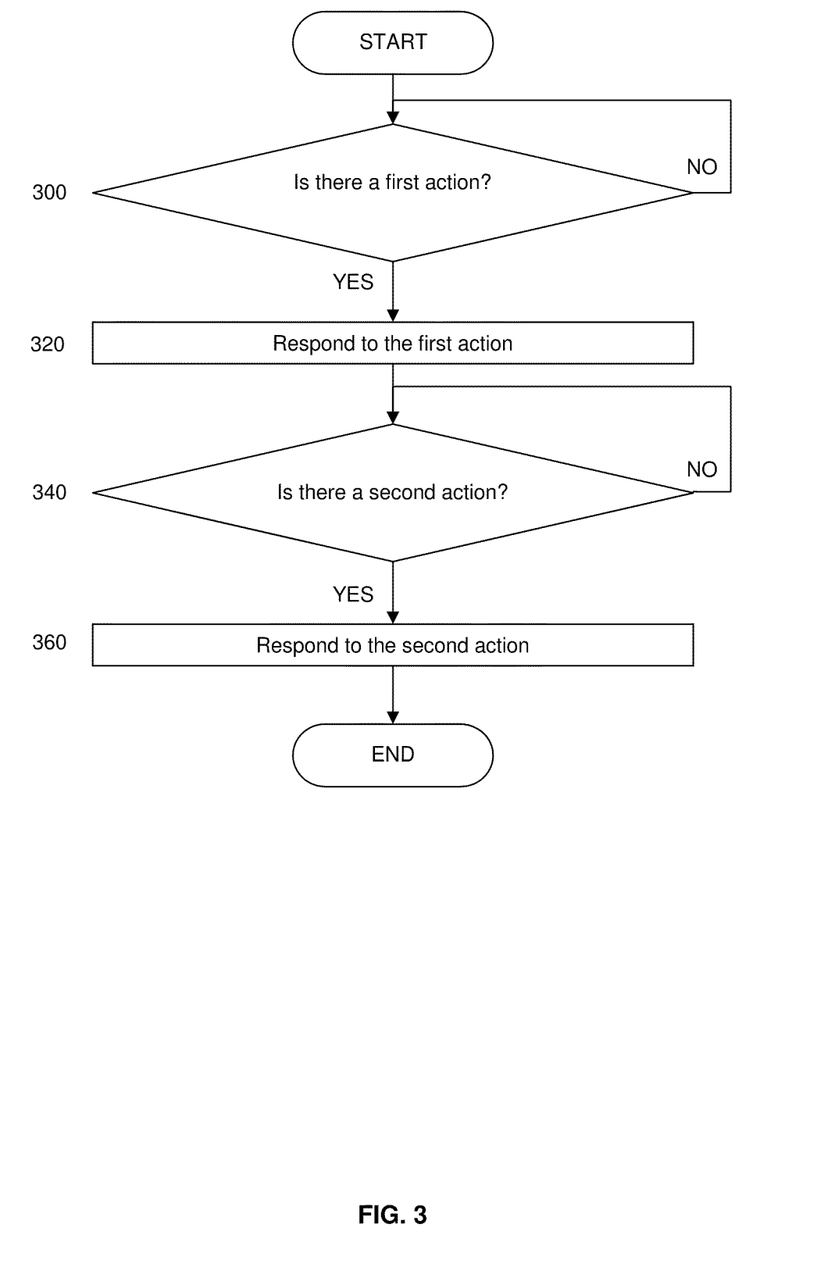
FIG. 3 is a flow chart illustrating a varied method for displaying content outside the initial boundary of an IFRAME container according to an embodiment of the present disclosure.

The method for displaying content outside the initial boundary of an IFRAME container may include variations to the above-described steps. Referring to FIG. 3, the varied method includes the steps of: detecting a first action that would cause a display of the floating content 300; and responding to the first action 320. The first action that may be one that would cause a display of the floating content.

The method may further include: detecting a second action 340; and responding to the second action 360. The second action may be one that would cause the floating content to be hidden.

Figure 4:
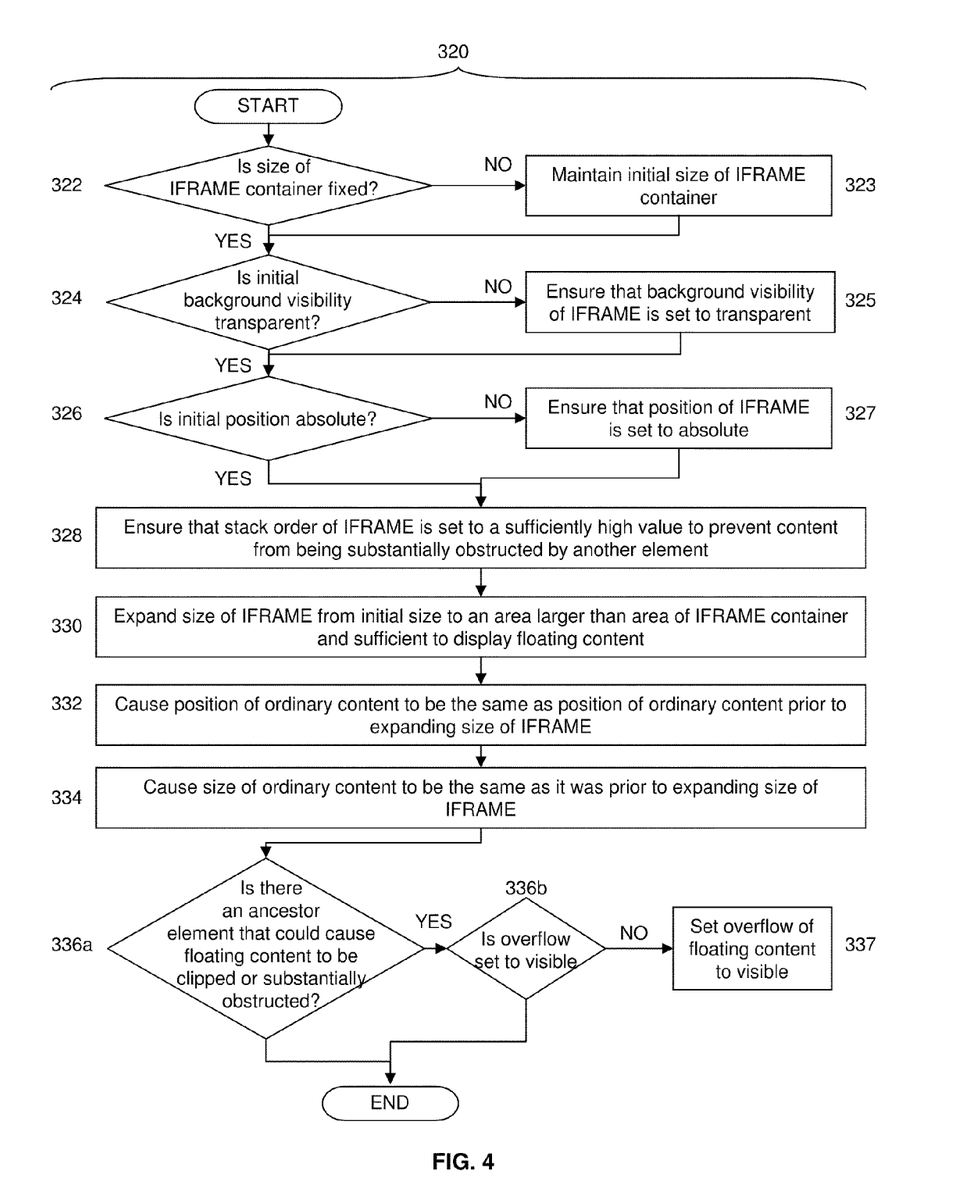
FIG. 4 is a flow chart illustrating the details of the operation of responding to the first action of the method according to an embodiment of the present disclosure.

Referring to FIG. 4, a flow chart illustrates details of the steps involved in responding to the first action 320. Responding to the first action is performed by carrying out the following:

maintain the initial size of the IFRAME container 323, if the size of the IFRAME container is not fixed 322 to prevent the content from expanding if the IFRAME is expanded. In some situations, the size of the IFRAME container, such as the width and the height, may already be fixed;

ensure that the background visibility of the IFRAME is set to transparent 325, if the initial background visibility is not transparent 324;

ensure that the position of the IFRAME is set to 'absolute' 327, if the initial position is not absolute 326. If the position property of an element is set to 'absolute,' that element will be positioned at specified coordinates relative to its containing block;

ensure that the stack order of the IFRAME is set to a sufficiently high value to prevent the floating content from being substantially obstructed by any other element(s) 328. This other element(s) may potentially be any other absolutely positioned element;

expand the size of the IFRAME from the initial size to an area larger than the area of the IFRAME container and sufficient to substantially display the floating content 330;

cause the position of the ordinary content to be the same as the position of the ordinary content prior to expanding the size of the IFRAME, where the prior position is relative to the parent element of the ordinary content 332;

cause the size of the ordinary content to be the same as it was prior to expanding the size of the IFRAME 334;

set the overflow of the floating content 140 to visible 337, if it has not been set to be visible 336b and an ancestor element would otherwise cause the floating content to be clipped or substantially obstructed 336a. The overflow property specifies what happens if floating content extends beyond an element's container or window. When the overflow value is set to 'visible,' the floating content does not get clipped, and instead the portion of the floating content that overflows the container is displayed. This is the default value of an element's overflow property. If the overflow value is set to 'hidden,' the overflow is clipped and becomes invisible. If the overflow value is set to 'auto,' the overflow is clipped and a scroll-bar is added in order to view the overflow. An ancestor element includes a parent element and the parent element is the element that immediately contains the IFRAME. To prevent clipping of the expanded IFRAME by an ancestor element, overflows are temporarily disabled for the duration of the first action such, e.g., the mouse-over. This step may involve first recursively retrieving the nodes of the DOM tree starting from the IFRAME. Then, for each node in the DOM tree that has the Cascading Style Sheets (CSS) property 'overflow: hidden' or 'overflow: auto', the overflow is set to 'visible.'

Causing the position of the ordinary content to be the same as the position of the ordinary content prior to expanding the size of the IFRAME 322 may include adjusting the margin of the ordinary content. The margin of ordinary content may be adjusted, for example, by using CSS, so that it covers the same area of the document as prior to the expansion of the IFRAME. In some situations, this applies to an element below the BODY of the HTML document that contains the ordinary content, not the BODY itself, as the floating content must still be within the BODY.

Figure 5:
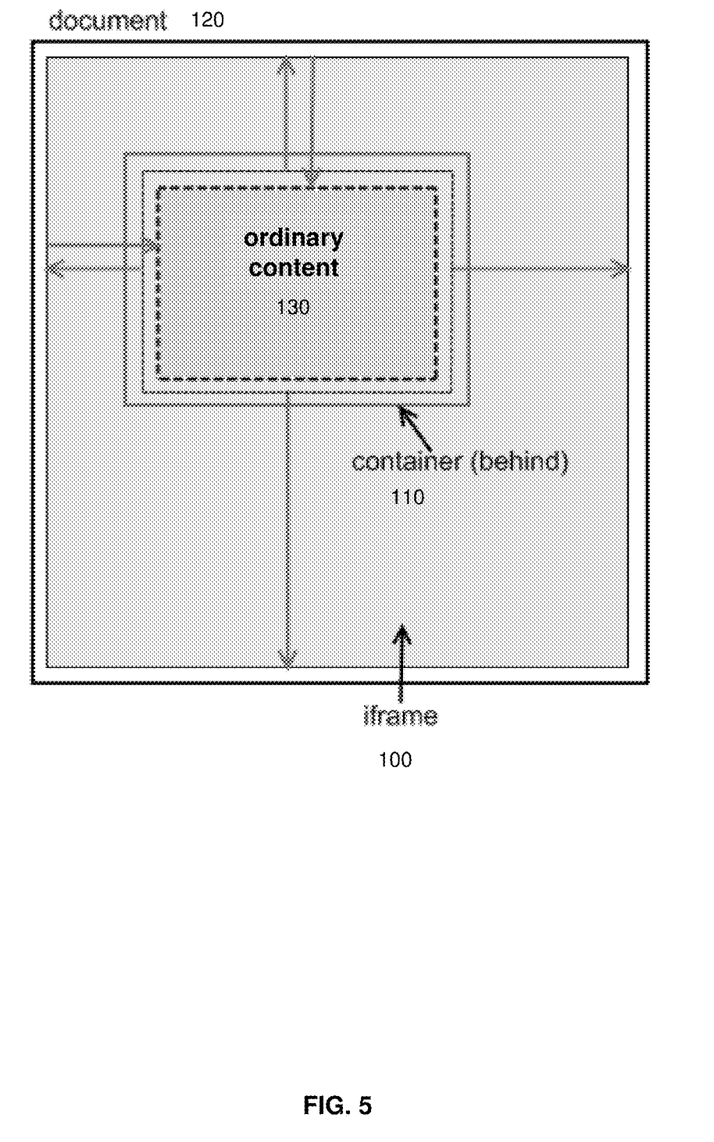
FIG. 5 is a block diagram that illustrates an expanded IFRAME according to an embodiment of the present disclosure.

Referring to FIG. 5, a block diagram illustrates an expanded IFRAME 100. The size of the IFRAME container 110 is fixed, the visibility of the IFRAME 100 is set to transparent, and the position of the IFRAME 100 is set to absolute. The stack order of the IFRAME 100 is set to a sufficiently high value so as to prevent the floating content 140 (see FIG. 6) from being substantially obstructed by other element(s). The IFRAME 100 is expanded from an initial size, which is the size when it was initially contained in the IFRAME container 110, to a new size, which is an area that is larger than the area of the IFRAME container 110 and sufficient to display the entire floating content 140 (see FIG. 6). The position and the size of the ordinary content 130 has been caused to be the same as that prior to expanding the size of the IFRAME 100. The overflow (not shown) of the ancestor element, which may be the overflow of the document 120, is set to visible, if the overflow exists.

Referring to FIG. 6, a block diagram illustrates an expanded IFRAME displaying floating content 140. The floating content 140 appears on the screen as extending beyond the IFRAME 100 after the performance of operations 323-332 in FIG. 4. FIG. 6 shows that the floating content 140 partially overlaps the area within the container. In other situations, the floating content may also be displayed entirely outside the IFRAME container (not shown in the figures.)

The floating content 140 will continue to display outside the IFRAME container 110 until another action causes the process to play out in reverse.

Figure 7:
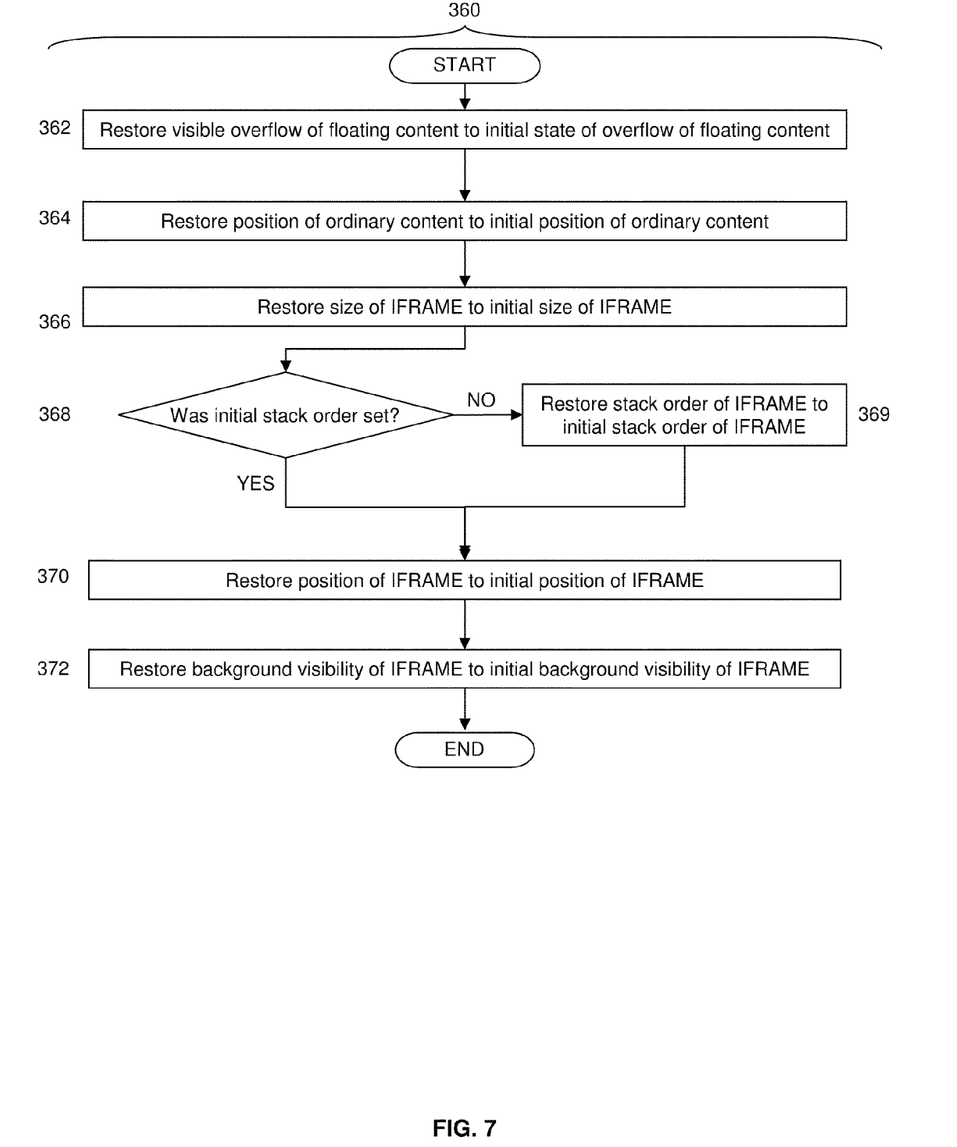
FIG. 7 is a flow chart illustrating the details of the operation of responding to the second action of the method according to an embodiment of the present disclosure.

Referring to FIG. 7, a flow chart illustrates details of the steps involved in responding to the second action 360. Responding to the second action is performed by restoring the following:

Restoring the visible overflow of the floating content to the initial state of the overflow of the floating content 362.

Restoring the position of the ordinary content to the initial position of the ordinary content 364.

Restoring the size of the IFRAME to the initial size of the IFRAME 366.

Restoring the stack order of the IFRAME to the initial stack order of the IFRAME 369, if the initial stack order was set 368.

Restoring the position of the IFRAME to the initial position of the IFRAME 370.

Restoring the background visibility of the IFRAME to the initial background visibility of the IFRAME 372.

The result of the above-described methods according to this embodiment of the present disclosure is a transition that is not visible to the user other than the fact the content appears to extend beyond the IFRAME container.

Although, in a preferred embodiment of the present disclosure, the operations of the methods may be performed in the order written, in other embodiments of the present disclosure, the operations need not be performed in any particular sequence unless implicitly required.

According to another embodiment of the present disclosure, a computer-implemented system is provided for displaying content outside the initial boundary of an IFRAME container. The system includes one or more devices that is capable of executing the methods.

Figure 8:
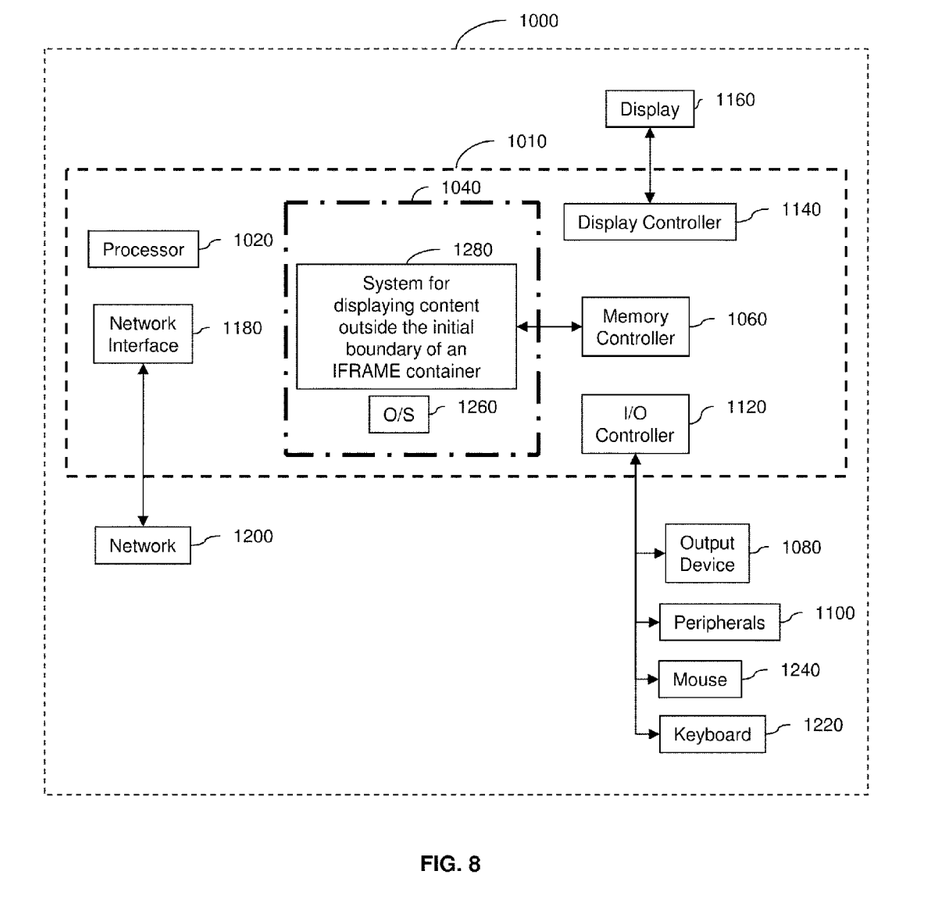
FIG. 8 is a block diagram illustrating the computer-implemented system for displaying content outside the initial boundary of an IFRAME container according to an embodiment of the present disclosure.

Referring to FIG. 8, a block diagram illustrates an exemplary computing system 1000 that includes a computer-implemented system for displaying content outside the initial boundary of an IFRAME container 1280. The computing system 1000 includes a computer 1010. As can be appreciated, the computing system 1000 may include any of a variety of known computing devices, including but not limited to, a desktop computer, a laptop, a server, a portable handheld device, or other electronic devices. For ease of this discussion, this embodiment of the disclosure will be discussed in the context of the computer 1010.

The computer 1010 is shown to include a processor 1020, memory 1040 coupled to a memory controller 1060, one or more input and/or output (I/O) devices 1080, 1100 (or peripherals) that are communicatively coupled via a local input/output controller 1120, and a display controller 1140 coupled to a display 1160. In an exemplary embodiment, the system 1000 may further include a network interface 1140 for coupling to a network 1200. The network 1200 transmits and receives data between the computer 1010 and external systems. In an exemplary embodiment, a conventional keyboard 1220 and mouse 1240 may be coupled to the input/output controller 1120.

The memory 1040 stores instructions that may be executed by the processor 1020. The instructions stored in memory 1040 may include one or more separate programs, each of which comprises an ordered listing of executable instructions for implementing logical functions. In the example shown in FIG. 8, the instructions stored in the memory 1040 include a suitable operating system (OS) 1260 to control the execution of other computer programs and provide scheduling, input-output control, file and data management, memory management, and communication control and related services.

The processor 1020 is configured to execute the instructions stored within the memory 1040, to communicate data to and from the memory 1040, and to generally control operations of the computer 1010 pursuant to the instructions. The processor 1020 may be a custom made or generally available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the computer-implemented system for displaying content outside the initial boundary of an IFRAME container 1280. In various embodiments, the system 1280 is stored in the memory 1040 (as shown), is executed from a portable storage device (e.g., CD-ROM, Diskette, FlashDrive, etc.) (not shown), and/or is run from a remote location such as from a central server (not shown).

According to still another embodiment of the present disclosure, a computer program product is provided for displaying content outside the initial boundary of an IFRAME container. The computer program product includes computer program instructions stored on a computer readable storage medium. When the instructions are executed, a computer will perform the steps of the methods.

As will be appreciated by those skilled in the art, aspects of the present disclosure may be embodied as a system or method (as described above) or as a computer program product. Accordingly, embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in one or more computer readable medium(s) having computer readable program code embodied thereon.

A combination of one or more computer readable medium (s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The computer program code for carrying out operations for aspects of the present disclosure may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of displaying content outside the initial boundary of an IFRAME container, wherein said content is displayed within an IFRAME and said IFRAME is initially contained within the boundary of said IFRAME container, the method comprising:
   detecting a first action; and
   based upon, at least in part, detecting the first action, expanding the size of said IFRAME to a size that is sufficient to substantially display said content with a floating effect, wherein expanding the size of the IFRAME includes, at least in part:
   maintaining an initial size of said IFRAME container;
   ensuring that a background visibility of said IFRAME is set to transparent;
   ensuring that a position of said IFRAME is set to absolute;
   ensuring that a stack order of said IFRAME is set to a sufficiently high value to prevent said content being displayed with a floating effect from being substantially obstructed by another element;
   expanding the size of said IFRAME from said initial size to an area larger than the area of said IFRAME container and sufficient to substantially display said content being displayed with a floating effect;
   causing the position of ordinary content to be the same as the position of ordinary content prior to expanding the size of said IFRAME, wherein said prior position is relative to the parent element of said ordinary content;
   causing the size of said ordinary content to be the same as it was prior to expanding the size of said IFRAME; and
   ensuring that the overflow of said content being displayed with a floating effect is set to visible, whereby an ancestor element does not cause said floating content to be clipped or substantially obstructed.

2. The method according to claim 1, wherein said size that is sufficient to substantially display said content with a floating effect is a size that is large enough such that a scrollbar is not required to view said floating portion.

3. The method according to claim 1, further comprising:
   detecting a second action; and
   restoring said size of said IFRAME to said initial size of said IFRAME.

4. A computer program product for displaying content outside the initial boundary of an IFRAME container, said computer program product comprising computer program instructions stored on a computer readable storage medium, wherein said instructions, when executed, will cause a computer to perform the method according to claim 1.

5. A computer-implemented system for displaying content outside the initial boundary of an IFRAME container, said system comprising one or more devices that executes the steps of the method according to claim 1.

6. A computer-implemented method of displaying content outside the initial boundary of an IFRAME container, wherein: an IFRAME is initially contained in said IFRAME container, said IFRAME has an initial size, an initial position, and an initial background visibility, said content is a floating content and/or ordinary content said floating content is ordinary content that displays with a floating effect; said ordinary content is displayed within said IFRAME, said ordinary content has an initial size and an initial position, the method comprising:
   detecting a first action that would cause a display of said floating content;
   responding to said first action by performing the following:
      maintaining the initial size of said IFRAME container;
      ensuring the background visibility of said IFRAME is set to transparent;
      ensuring that the position of said IFRAME is set to absolute;
      ensuring that the stack order of said IFRAME is set to a sufficiently high value to prevent said floating content from being substantially obstructed by another element;

expanding the size of said IFRAME from said initial size to an area larger than the area of said IFRAME container and sufficient to substantially display said floating content;

causing the position of said ordinary content to be the same as the position of said ordinary content prior to expanding the size of said IFRAME, wherein said prior position is relative to the parent element of said ordinary content;

causing the size of said ordinary content to be the same as it was prior to expanding the size of said IFRAME; and ensuring that the overflow of said floating content is set to visible, whereby an ancestor element does not cause said floating content to be clipped or substantially obstructed.

7. The method according to claim 6, further comprising:

detecting a second action that would cause said display of said floating content to be displayed within said IFRAME container; and responding to said second action by restoring:

said visible overflow of said floating content to the initial state of said overflow of said floating content, said position of said ordinary content to said initial position of said ordinary content, said size of said IFRAME to said initial size of said IFRAME, said stack order of said IFRAME to the initial stack order of said IFRAME, said position of said IFRAME to said initial position of said IFRAME, and said background visibility of said IFRAME to said initial background visibility of said IFRAME.

8. The method according to claim 6, wherein causing said position of said ordinary content to be the same as it was prior to expanding the size of said IFRAME comprises adjusting the margin of said ordinary content.

9. A computer program product for displaying content outside the initial boundary of an IFRAME container, said computer program product comprising computer program instructions stored on a computer readable storage medium, wherein said instructions, when executed, will cause a computer to perform the method according to claim 6.

10. A computer-implemented system for displaying content outside the initial boundary of an IFRAME container, said system comprising one or more devices that executes the method according to claim 6.

11. A computer-implemented method of displaying content outside the initial boundary of an IFRAME container, wherein said IFRAME has an initial size, the method comprising:

displaying ordinary content in said IFRAME having said initial size;

detecting a first action; and responding to said first action by performing the following:
 generating floating content;
 maintaining the initial size of said IFRAME container;
 ensuring the background visibility of said IFRAME is set to transparent;
 ensuring that the position of said IFRAME is set to absolute;
 expanding the size of said IFRAME from said initial size to an area larger than the area of said IFRAME container and sufficient to substantially display said floating content;
 causing the position of said ordinary content to be the same as the position of said ordinary content prior to expanding the size of said IFRAME,
 wherein said prior position is relative to the parent element of said ordinary content;
 causing the size of said ordinary content to be the same as it was prior to expanding the size of said IFRAME; and
 ensuring that the stack order of said IFRAME container is set to a sufficiently high value to prevent said floating content from being substantially obstructed by other elements.

12. The method according to claim 11, further comprising:

detecting a second action; and responding to said second action by removing said floating content from the display and restoring said size of said IFRAME to its initial size.

13. A computer program product for displaying content outside the initial boundary of an IFRAME container, said computer program product comprising computer program instructions stored on a computer readable storage medium, wherein said instructions, when executed, will cause a computer to perform the method according to claim 11.

14. A computer-implemented system for displaying content outside the initial boundary of an IFRAME container, said system comprising one or more devices that executes the method according to claim 11.

* * * * *